US006249217B1

(12) United States Patent
Forbes

(10) Patent No.: US 6,249,217 B1
(45) Date of Patent: *Jun. 19, 2001

(54) METHOD FOR RETRIEVING VEHICULAR COLLATERAL

(76) Inventor: Mark P. Forbes, 27758 Santa Margarita Pkwy., #314, Mission Viejo, CA (US) 92691

( * ) Notice: Subject to any disclaimer, the term of this patent is extended or adjusted under 35 U.S.C. 154(b) by 0 days.

This patent is subject to a terminal disclaimer.

(21) Appl. No.: 09/430,424

(22) Filed: Oct. 29, 1999

Related U.S. Application Data

(63) Continuation of application No. 09/103,419, filed on Jun. 24, 1998, now Pat. No. 6,025,774.

(51) Int. Cl.$^7$ .................................................. B60R 25/10
(52) U.S. Cl. .......................... 340/426; 235/384; 340/988; 342/457; 701/213; 705/38
(58) Field of Search ..................... 340/426, 988, 340/989, 990, 928; 342/457; 701/207, 208, 213; 180/287; 705/38; 235/379, 380, 384

(56) References Cited

U.S. PATENT DOCUMENTS

| | | | |
|---|---|---|---|
| 4,736,294 | 4/1988 | Gill et al. ............................. | 235/379 |
| 5,323,315 | 6/1994 | Highbloom ........................... | 235/379 |
| 5,450,329 | 9/1995 | Tanner ................................. | 340/973 |
| 5,459,304 | 10/1995 | Eisenmann .......................... | 235/380 |
| 5,513,244 | 4/1996 | Joao et al. ........................... | 340/539 |
| 5,519,621 | 5/1996 | Wortham .............................. | 340/989 |
| 5,612,683 | 3/1997 | Trempala et al. ................. | 340/825.31 |
| 5,629,693 | 5/1997 | Janky .................................. | 340/988 |
| 5,652,707 | 7/1997 | Wortham .............................. | 340/990 |
| 5,673,305 | 9/1997 | Ross .................................... | 340/426 |
| 5,914,675 | 6/1999 | Tognazzini .......................... | 340/426 |
| 5,929,752 | 7/1999 | Janky et al. ......................... | 340/988 |
| 6,025,774 | * 2/2000 | Forbes ................................. | 340/426 |
| 6,069,570 | * 5/2000 | Herring .............................. | 340/825.49 |

OTHER PUBLICATIONS

Lo Jack flyer of 1 page entitled *Lo Jack Protects Your Car.*

* cited by examiner

Primary Examiner—Brent A. Swarthout
(74) Attorney, Agent, or Firm—Stetina Brunda Garred & Brucker

(57) ABSTRACT

In accordance with the present invention, there is provided a method of securing collateral for a loan when indicated by a loan status wherein the collateral is a vehicle. The method provides for installing a transmitter within the vehicle. The transmitter is capable of transmitting locational data regarding the vehicle. The loan status is monitored for a default condition. A data link is established from a base terminal to the transmitter of the vehicle upon an occurrence of the default condition in the loan status. Locational data is transmitted from the transmitter of the vehicle to the base terminal via the data link. The location of the vehicle is determined from the locational data transmitted to the base terminal. Finally, the vehicle is confiscated.

15 Claims, 2 Drawing Sheets

METHOD FOR RETRIEVING VEHICULAR COLLATERAL

This is a continuation of application Ser. No. 09/103,419 filed Jun. 24, 1998, now U.S. Pat. No. 6,025,774.

FIELD OF THE INVENTION

The present invention relates generally to a method of collateral retrieval, and more particularly to a method of retrieving vehicular collateral in which a transmitter is installed in the vehicle which provides locational data.

BACKGROUND OF THE INVENTION

Generally, vehicles such as automobiles have been financed through a personal loan system, whereby the purchaser borrows money from a financial or lending institution, takes title to the automobile and pays the loan balance in monthly payments which amortize the full amount of the loan. Typically, the financial institution retains a lien interest against the title of the vehicle and the loan is secured by a chattel mortgage thereon. The financial institution may confiscate or repossess the vehicle upon a default condition of the loan, as agreed to by the purchaser or as provided at law. It is contemplated that a default condition may arise where the loan payments are delinquent for a predetermined interval. Thus, the vehicle is used as collateral for the loan used to purchase the vehicle.

Additionally, lease arrangements are entered into whereby the lessee makes monthly rental payment, returning the vehicle to the lessor at the end of a predetermined term specified in the lease. Title typically remains with the lessor. It is sometimes specified in the lease that the lessee may at the lessee's option purchase the vehicle when the lease expires. In the event that the lessee defaults in making lease payments, the lessor may confiscate or repossess the vehicle.

Thus, upon a default condition of the loan or lease (these terms may be used interchangeably herein) the lending institution may seek to confiscate the loan collateral, i.e., the vehicle. Thus, the lending. institution will authorize repossession personnel to confiscate the vehicle. Such confiscation processes may potentially require extensive resources and result in a time consumptive, expensive endeavor. Typically, the repossession personnel being the confiscation process with nothing more than the vehicle holder's last known billing address. Not only may such address be no longer valid, the vehicle may not be kept or stored at such location. Moreover, the individual responsible for the loan may even be actively avoiding being located and the vehicle being repossessed.

SUMMARY OF THE INVENTION

In accordance with the present invention, there is provided a method of securing collateral for a loan when indicated by a loan status wherein the collateral is a vehicle. The method provides for installing a transmitter within the vehicle. The transmitter is capable of transmitting locational data regarding the vehicle. The loan status is monitored for a default condition. A data link is established from a base terminal to the transmitter of the vehicle upon an occurrence of the default condition in the loan status. Locational data is transmitted from the transmitter of the vehicle to the base terminal via the data link. The location of the vehicle is determined from the locational data transmitted to the base terminal. Finally, the vehicle is confiscated.

Preferably, the data link is established at predetermined intervals and locational data from the transmitter to the base terminal is transmitted via the data link to verify the operation of the transmitter. In addition, the transmitter is capable of sensing any physical tampering therewith and a tamper signal is transmitted in response to any sensed tampering via data link. Advantageously, the transmitter may be powered with a rechargeable battery. Furthermore, the method of the present invention may provide for deactivating the vehicle and enabling a vehicle alarm upon the loan status being in a default condition. In other embodiments of the present invention, the transmitter may be a cellular telephone and locational data may be based upon Global Positioning Satellite (GPS) technology.

As such, based on the foregoing, the present invention mitigates the inefficiencies and limitations associated with prior art methods of retrieving vehicular collateral. Advantageously, the method of the present invention facilitates expedient location and confiscation of vehicular collateral. The transmitter allows a lending institution to virtually instantaneously determine the location of a collateralized vehicle upon the loan status being in a default condition. In addition, the method may utilize current GPS technology to determine with a high degree of precision the location of the vehicle. Further still, the method may provide for an alarm within the vehicle to be enabled so as to further facilitate location and confiscation of the vehicle. In comparison, traditional methods of vehicular collateral retrieval typically begin with the lending institution via an agent thereof using only the last documented address for the individual responsible for the loan. Not only may such address be no longer valid, the vehicle may not be kept or stored at such location. Moreover, the individual responsible for the loan may even be actively avoiding being located and the vehicle being repossessed. As such, vehicle confiscation process may potentially be long and costly.

Additionally, the method of the present invention preferably provides for a verification process of operability of the transmitter. As such, the lending institution is able to test the installed transmitter by having the transmitter periodically send signals. Further, the method provides for the transmitter to alert the lending institution if the transmitter is tampered with. Thus, the lending institution has the benefit being confident that there is a high probability of retrieving the vehicle, should such course of action be necessary, by being able both verify the operability of the transmitter and having a tamper alert system in place.

Accordingly, the present invention represents a significant advance in the art.

BRIEF DESCRIPTION OF THE DRAWINGS

These, as well as other features of the present invention, will become more apparent upon reference to the drawings wherein.

DETAILED DESCRIPTION OF THE PREFERRED EMBODIMENT

Figure 1:
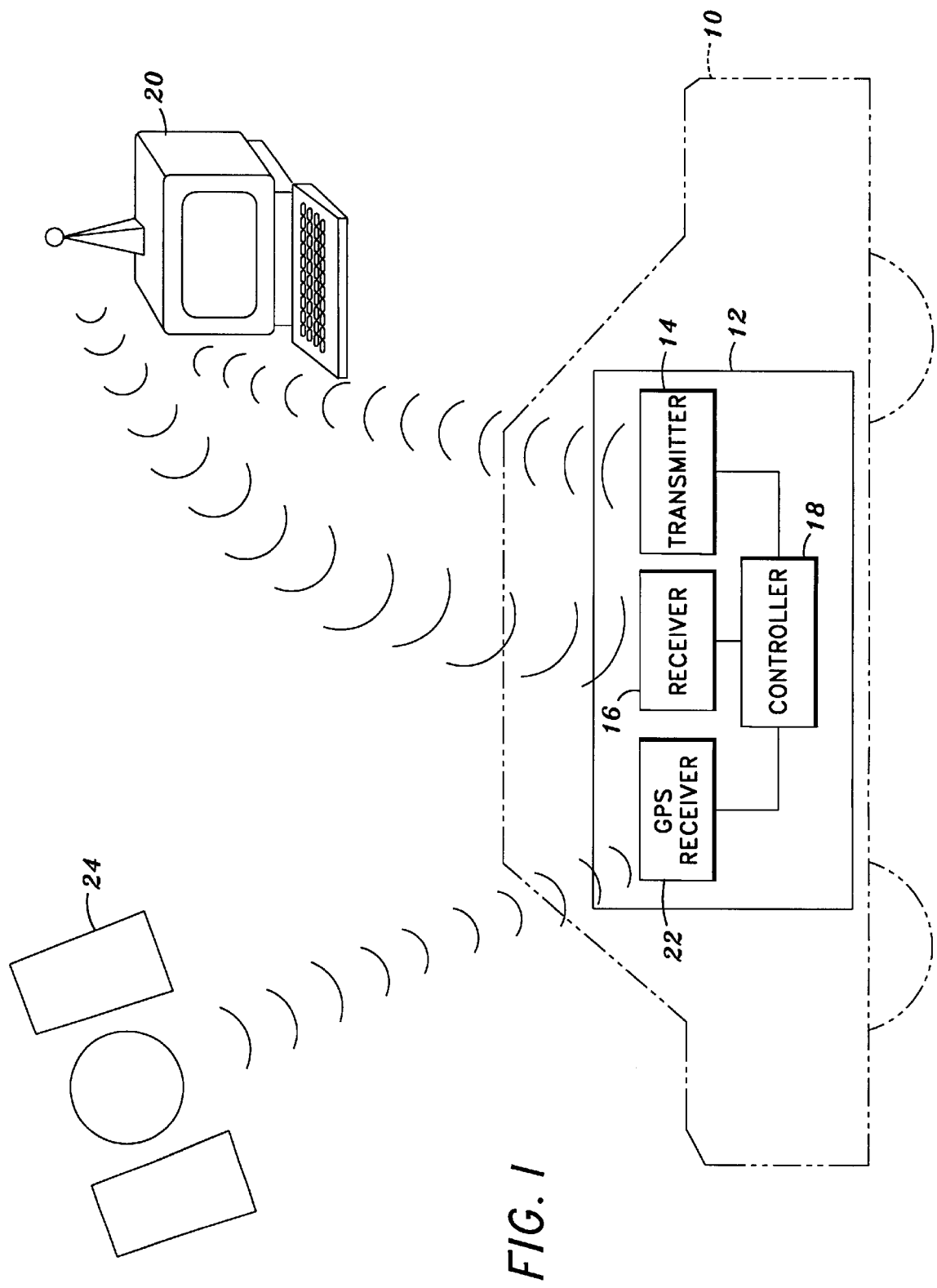
FIG. 1 symbolically depicts vehicle retrieval apparatus and system configuration utilized in the preferred embodiment of the present invention.
Figure 2:
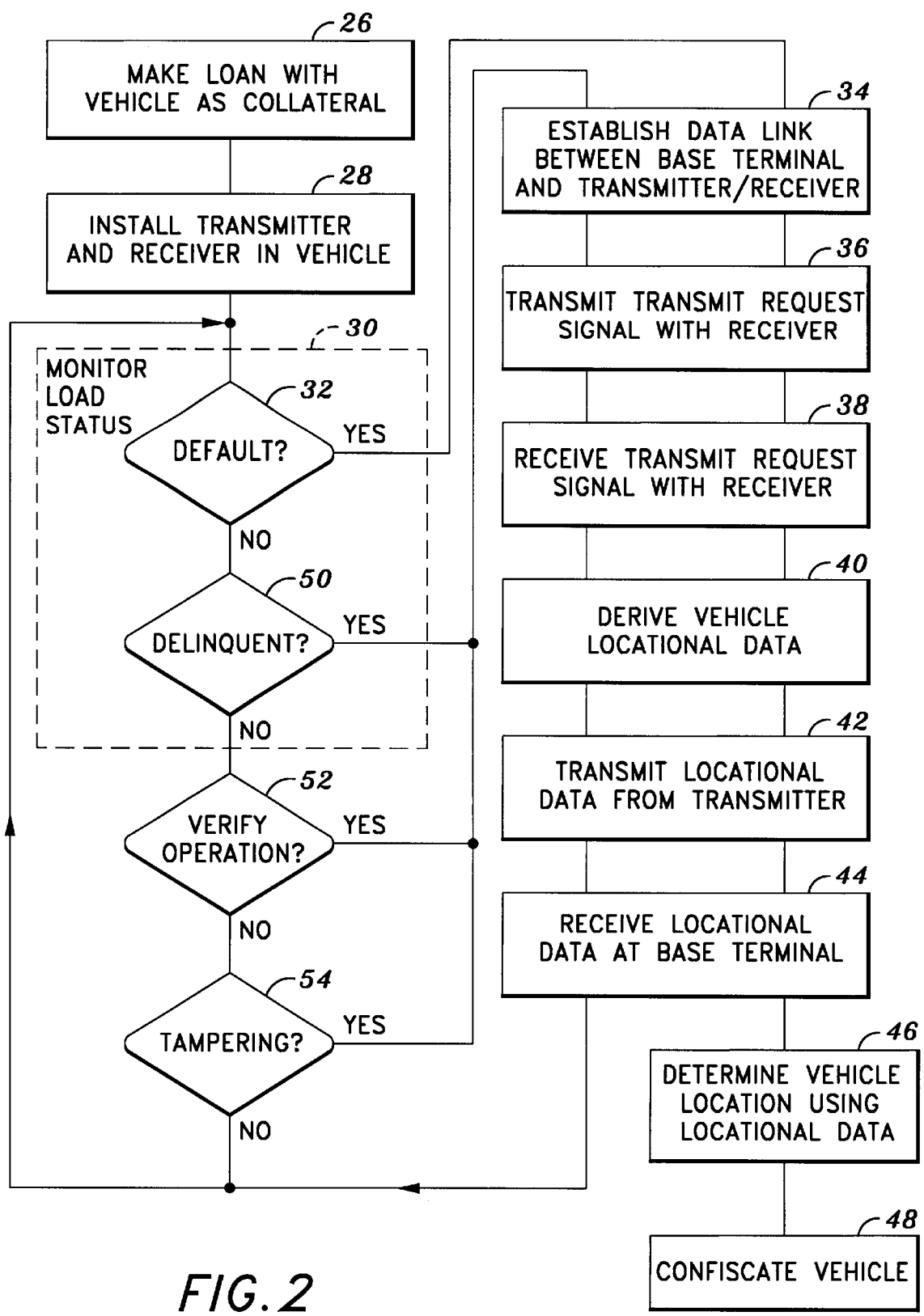
FIG. 2 a flow diagram of steps of the method of the present invention.

Referring now to the drawings wherein the showings are for purposes of illustrating a preferred embodiment of the present invention only, and not for purposes of limiting the same, FIGS. 1 and 2 illustrate a method of retrieving vehicular collateral in accordance with the present invention.

As a preliminary matter, it is contemplated that a lending institution makes 26 a loan/lease arrangement with a borrower respecting a vehicle 10. The vehicle 10 is used as collateral for the loan. Whether the vehicle 10 is purchased, leased or rented, it is understood that the party seeking to secure, confiscate, repossess or otherwise seize the vehicle may be a bank, savings and loan, mortgage company, credit union, vehicle dealership, vehicle manufacturer, leasing agent, collection agency, or any other lending/financial institution and agents thereof. It if further understood that the holder or possessor of the vehicle may be the individual responsible for payment of the vehicle loan/lease and may be referred to as the purchaser, debtor, borrower or lessee. For purposes of the present invention, the term vehicle 10 is contemplated to include automobiles, trucks, motor cycles, boats, house boats, airplanes, helicopters, house trailers, mobile homes, recreational vehicles, heavy machinery (such as tractors) and other devices used for transportation.

In accordance with the present invention, there is provided a method of securing vehicular collateral when indicated by a loan status. The loan status may have a paid current condition and a default condition. When the loan status is in a default condition, it is contemplated that the lending institution may be entitled to confiscate or repossess the vehicle 10.

The method provides for installing 28 a transmitter 14 within the vehicle 10. The transmitter 14 is capable of transmitting locational data regarding the vehicle 10. The loan status is monitored 30 for a default condition 32. Upon an occurrence of the default condition 32 in the loan status, a data link is established 34 from a base terminal 20 to the transmitter 14 of the vehicle 10. Locational data is transmitted 42 from the transmitter 14 of the vehicle 10 to the base terminal 20 via the data link. The location of the vehicle 10 is determined 46 from the locational data transmitted to the base terminal 20. Thus, as early as the loan status having entered into a default condition, the general whereabouts of the collateralized vehicle 10 may be known to the lending institution, e.g., the base terminal 20. Finally, the method provides for the vehicle 10 to be confiscated 48, and thus completing the collateral securing process.

In the preferred embodiment of the method of the present invention, a retrieval apparatus 12 is installed 28 in the vehicle 10. The retrieval apparatus 12 is provided with the transmitter 14, a base communication receiver 16 and a controller 18. It is contemplated that the transmitter 14 and base communication receiver 16 may be the same device, i.e., a transceiver. Furthermore, the transmitter 14 and base communication receiver 16 may take the form of a cellular telephone or other communications device. The transmitter 14 and the base communication receiver 16 are capable of respectively transmitting and receiving signals to and from the base terminal 20. Such signals are distinct electromagnetic digital signals which may be RF signal, for example. It is contemplated that the retrieval apparatus 12 need not necessarily be provided with a base communication receiver 16. Thus, the retrieval apparatus 12 may be passive in nature and may periodically or constantly transmit locational signals.

The transmitter 14 and base communication receiver 16 are electrically connected to a controller 18. The controller 18 may be any type of digital processing device, or computer, such as a microprocessor. The use of a microprocessor as the controller 18 provides for versatility in programmability and provides for an apparatus which can be made as small in size as possible. By providing for an apparatus which is an small in size as possible, a more concealed installation of the retrieval apparatus 12 in the vehicle 10 can be achieved.

In operation, the base terminal 20 may be in electrical communication with a computer network of the lending institution. The computer network contains data respecting the status of the loan. Upon the loan status being in a default condition 32, the base terminal 20 originates and transmits 36 a transmit request signal. The base communication receiver 16 is configured to receive the transmit request signal from the base terminal 20. Thus, a data link is established 34 between the base terminal 20 and retrieval apparatus 12 disposed within the vehicle 10. The base communication receiver 16 receives 38 the transmit request signal and the controller 18 processes the transmit request signal. In response, the controller 18 initiates the transmitter 14 to transmit 42 locational data of the vehicle 10 to the base terminal 20 via the data link.

It is contemplated that the loan status may further have a delinquent condition, wherein the loan is not paid current. The default condition is one where the loan has not been paid current for a predetermined interval. Thus, typically prior to the loan status being in a default condition, the loan status will be in a delinquent condition. Such a delinquent condition may be used to trigger the transmission of a transmit request signal from the base terminal 20 to the retrieval apparatus 12 as discussed above. Thus, the method of the present invention may further include monitoring 30 the status of the loan to for a delinquent condition 50 and subsequently establishing 34 a data link from the base terminal 20 to the transmitter 14 upon an occurrence of the delinquent condition. The locational data received 44 by the base terminal 20 in response to the transmit request signal may be stored for future use. For example, in the event that the retrieval apparatus 12 is later damaged or inoperable and the loan status is in a default condition, the stored locational data may provide a valuable lead for the repossession personnel to locate and confiscate the vehicle 10.

Subsequent to the receipt of the transmit request signal by the base communication receiver 16, the vehicle locational data 40 is derived regarding the vehicle 10. Various methods deriving 40 such data may be utilized. It is contemplated that those methods of configuring a system to derive locational data respecting the location of the vehicle 10 utilizing a transmitter and/or receiver are chosen from those well known to one of ordinary skill in the art. In a very simple embodiment, the transmitted signals from the transmitter 14 themselves provide locational data. In this respect, such signals provide directional data which can be used to locate the emanating source, i.e., the transmitter 14 in the vehicle 10. In such an embodiment, the base terminal 20 may additionally be mobile and directionally receive the transmitted signals. In another embodiment, the base terminal 20 may be in electronic communication with a plurality of mobile base terminals or an array of antennas which are directionally sensitive and thereby facilitating triangulation techniques to locate the vehicle 10.

In the preferred embodiment of the present invention, however, Global Positioning Satellite (GPS) technology is used to derive 40 the locational data. The retrieval apparatus 10 may further be provided with a GPS positioning signal receiver 22. A GPS data link is established from a global positioning satellite (GPS) 24 to the GPS positioning signal receiver 22 upon the receipt of the transmit request signal. A GPS positioning signal is received by the GPS positioning signal receiver 22 via the GPS data link. As one of ordinary skill in the art will appreciate, the locational data is derivable from the GPS positioning signal. Such locational data is then transmitted 42, as described above. It is contemplated that the GPS locational data provides very precise information as to the location of the vehicle 10, and therefore facilitates the efficient determination 46 of the location and the confiscation 48 of the vehicle 10.

In addition, the method of the present invention provides for a system operability verification procedure. A data link is established 34 from the base terminal to the transmitter at predetermined intervals prior to any occurrence of a default condition. The base terminal 20 originates and transmits 36 a transmit request signal which is received 38 by the base communication receiver 16. In response, the transmitter 14 of the vehicle 10 transmits 42 locational data back to the base terminal 20. The receipt of such locational data at the base terminal 20 successfully verifies the operation of the retrieval apparatus 12 including the transmitter 14 and the base communications receiver 16 therein. In addition, the received locational data may be stored for future use should reference to such data be desired. In operation, such a verification procedure could be followed monthly, for example. In the event that locational data is not received by the base terminal 20, and therefore a failed verification occurs, the lending institution may follow-up in contacting the borrower, and correct any problems or defects in the retrieval apparatus 12. Thus, such a verification procedure allows to the lending institution to increase its probability that the retrieval apparatus 12 will function as designed to facilitate the securing of the collateralized vehicle 10.

The method of the present invention is preferably provided with a procedure of alerting the lending institution that the retrieval apparatus 12 has been physically tampered with. In this respect, the retrieval apparatus 12 and/or components thereof (e.g., transmitter 14, base communication receiver 16, GPS positioning signal receiver 22, etc.) are configured to be capable of sensing any physical tampering therewith and transmitting a tamper signal in response to any sensed tampering. Thus, the data link is established 34 from the base terminal 20 to the transmitter 14 upon the sensing 54 of any physical tampering with the retrieval apparatus 12. It is contemplated that the method of determining whether the retrieval apparatus 12 has been tampered with is chosen from those well known to one of ordinary skill in the art and may include electrical and electromechanical devices. Advantageously, it is contemplated that such a tampering alert procedure increases the probability that the retrieval apparatus 12 will function properly when desired because the lending institution may become aware of any such tampering prior to the loan entering into a default condition and the mere existence of the tampering alert procedure may deter acts of intentional damage to the retrieval apparatus.

While the retrieval apparatus 12 may be solely powered via the electrical system of the vehicle 10, the retrieval apparatus 10 is preferably additionally powered with a rechargeable battery. In such a configuration, the rechargeable battery is electrically connected to a generator/alternator of the vehicle 10 and is recharged during operation of the vehicle 10. Thus, the retrieval apparatus 12 may utilize the rechargeable battery as a back-up or alternate power supply. Advantageously, use of a rechargeable battery mitigates against unwanted and possibly intentional deactivation of the retrieval apparatus 12 where the vehicle battery is disconnected or the vehicle 10 is not in use.

In addition to the base communication receiver 16 being able to receive transmit request signals, a vehicle alarm signal may also be received. In this regard, the vehicle 10 may be provided with an audio and/or visual devices which are in electrical communication with the controller 18. Such devices may be the vehicle's horn, lights, speakers, etc. The method of the present invention provides for the transmitting of a vehicle alarm signal from the base terminal 20 to the base communication receiver 16 and receiving the vehicle alarm signal with the base communication receiver 16. The vehicle alarm signal is then communicated to the controller 18 which electrically enables the vehicle alarm. Such an alarm enablement step is contemplated to facilitate the determination of the exact location of the vehicle 10 once vehicle repossession personnel are within personal sensory range of the vehicle alarm system. Thus, while the locational data which is used by vehicle repossession personnel may allow such personnel to be within the generally locality of the vehicle 10, the sounding of the vehicle horn or illumination vehicle headlamps may further facilitate finding the vehicle 10. This is especially the case where the vehicle 10 is hidden or concealed within a garage, for example.

The base communication receiver 16 may be further capable of receiving a deactivation signal from the base terminal 20 and the controller 18 may be in electrical communication with any number of devices which would facilitate deactivation of the vehicle 10, such the vehicle ignition or fuel system. As such, it is contemplated that the base terminal 20 may transmit a deactivation signal to the base communication receiver 16 via the data link. Upon receipt of the deactivation signal with the base communication receiver 16, the controller 18 may process such signal and initiate the deactivation of the vehicle 10. It is contemplated that the method of deactivating the vehicle 10 via the initiation by the controller 18 is chosen from those well known to one of ordinary skill in the art.

Additional modifications and improvements of the present invention may also be apparent to those of ordinary skill in the art. Thus, the particular combination of parts described and illustrated herein is intended to represent only one embodiment of the present invention, and is not intended to serve as limitations of alternative devices within the spirit and scope of the invention.

What is claimed is:

1. A method of securing collateral for a loan when indicated by a loan status, the collateral comprises a vehicle, a transmitter capable of transmitting locational data regarding the vehicle is installed within the vehicle, the method comprising the steps of:

(a) receiving a signal in response to a change in the loan status;

(b) establishing a data link from a base terminal to the transmitter upon the receipt of the signal representative of a change in the loan status;

(c) transmitting locational data from the transmitter to the base terminal via the data link; and (d) determining the location of the vehicle from the locational data transmitted to the base terminal for use in confiscating the vehicle.

2. The method of claim 1 wherein the change in the loan status includes the loan entering into a default condition.

3. The method of claim 1 wherein the change in the loan status includes the loan entering into a delinquent condition.

4. The method of claim 1 wherein a base communication receiver capable of receiving a transmit request signal is installed within the vehicle, step (b) further comprises the steps of:

(1) establishing a data link from a base terminal to the base communication receiver upon the receipt of a signal representative of a default condition in the loan status; and (2) receiving a transmit request signal from the base terminal with the base communication receiver via the data link.

5. The method of claim 4 wherein step (b) further comprises the steps of:
  (1) establishing the data link from the base terminal to the base communication receiver at predetermined intervals prior to any receipt of a signal in response to a change in the loan status; and
  (2) receiving locational data transmitted from the transmitter to the base terminal via the data link to verify the operation of the base communication receiver.

6. The method of claim 1 wherein step (b) further comprises the steps of:
  (1) establishing the data link from the base terminal to the transmitter at predetermined intervals prior to any receipt of a signal in response to a change in the loan status; and
  (2) receiving locational data transmitted from the transmitter to the base terminal via the data link to verify the operation of the transmitter.

7. The method of claim 6 wherein step (b) further comprises the step of:
  (3) storing the locational data.

8. The method of claim 1 wherein the transmitter is capable of sensing physical tampering therewith and transmitting a tamper signal in response to any sensed tampering, step (b) further comprises the step of:
  (1) establishing the data link from the base terminal to the transmitter upon the sensing of any physical tampering with the transmitter.

9. The method of claim 1 wherein the vehicle has an alarm, a base communication receiver capable of receiving a vehicle alarm signal is installed within the vehicle, step (d) further comprises the step of:
  (1) transmitting a vehicle alarm signal from the base terminal to the base communication receiver via the data link for enabling the vehicle alarm.

10. The method of claim 1 wherein a base communication receiver capable of receiving a vehicle deactivation signal is installed within the vehicle, step (d) further comprises the step of:
  (1) transmitting a deactivation signal from the base terminal to the base communication receiver via the data link for deactivating the vehicle.

11. The method of claim 1 wherein a GPS positioning signal receiver is installed within the vehicle and the transmitted locational data is based upon a received GPS positioning signal.

12. The method of claim 1 wherein the transmitter is a cellular phone.

13. The method of claim 1 wherein the base terminal is mobile.

14. The method of claim 13 wherein step (d) further comprising the step of:
  (1) moving the base terminal to determine the location of the vehicle.

15. A method of securing collateral for a loan when indicated by a loan status, the collateral comprises a vehicle, a transmitter capable of transmitting locational data regarding the vehicle is installed within the vehicle, the method comprising the steps of:
  (a) receiving a signal in response to a change in the loan status;
  (b) establishing a data link from a base terminal to the transmitter upon the receipt of the signal representative of the loan status being in a default condition;
  (c) transmitting locational data from the transmitter to the base terminal via the data link; and
  (d) determining the location of the vehicle from the locational data transmitted to the base terminal for use in confiscating the vehicle.

* * * * *

(12) EX PARTE REEXAMINATION CERTIFICATE (8304th)
United States Patent
Forbes

(10) Number: US 6,249,217 C1
(45) Certificate Issued: Jun. 7, 2011

(54) METHOD FOR RETRIEVING VEHICULAR COLLATERAL

(75) Inventor: Mark P. Forbes, Mission Viejo, CA (US)

(73) Assignee: Calamp Data Com, Inc., Oxnard, CA (US)

Reexamination Request:
No. 90/010,661, Sep. 23, 2009

Reexamination Certificate for:
Patent No.: 6,249,217
Issued: Jun. 19, 2001
Appl. No.: 09/430,424
Filed: Oct. 29, 1999

Related U.S. Application Data

(63) Continuation of application No. 09/103,419, filed on Jun. 24, 1998, now Pat. No. 6,025,774.

(51) Int. Cl.
*B60R 25/00* (2006.01)
*G01S 5/14* (2006.01)

(52) U.S. Cl. .................... 340/426.19; 340/988; 235/384; 342/457; 701/213; 705/38

(58) Field of Classification Search ........................ None
See application file for complete search history.

(56) References Cited

U.S. PATENT DOCUMENTS

| | | | |
|---|---|---|---|
| 3,580,353 A | 5/1971 | Thompson |
| 4,398,172 A | 8/1983 | Carroll et al. |
| 4,736,294 A | 4/1988 | Gill et al. |
| 4,887,004 A | 12/1989 | Kraaij et al. |
| 4,891,650 A | 1/1990 | Sheffer |
| 5,014,206 A | 5/1991 | Scribner et al. |
| 5,032,845 A | 7/1991 | Velasco |
| 5,119,504 A | 6/1992 | Durboraw, III |
| 5,221,925 A | 6/1993 | Cross |
| 5,223,844 A | 6/1993 | Mansell et al. |
| 5,225,842 A | 7/1993 | Brown et al. |
| 5,257,195 A | 10/1993 | Hirata |
| 5,276,728 A | 1/1994 | Pagliaroli et al. |
| 5,311,197 A | 5/1994 | Sorden et al. |
| 5,323,152 A | 6/1994 | Morita |

(Continued)

FOREIGN PATENT DOCUMENTS

| | | |
|---|---|---|
| EP | 0242099 | 10/1987 |
| GB | 2279478 | 1/1995 |
| WO | WO95/13943 | 5/1995 |
| WO | WO95/17686 | 6/1995 |

OTHER PUBLICATIONS

Declaration of Gallin Chen, 8 pgs.
Affidavit of James Bass, 1 pg.
Affidavit of William C. Kennedy, 2 pgs.
Affidavit of Kenneth Westerlage, 2 pgs.
Elite Logistics Inc—ELOG Quarterly Roport of Financial Condition; Form 10QSB, Item 2 Management's Discussion and Analysis of Financial Condition and Results of Operation, printed Jan. 25, 2008 from http://sec.edgar-online.com/2001/04/0000950134-01-003308/Section_8, 9 pages.

(Continued)

*Primary Examiner* — Sam Rimell

(57) ABSTRACT

In accordance with the present invention, there is provided a method of securing collateral for a loan when indicated by a loan status wherein the collateral is a vehicle. The method provides for installing a transmitter within the vehicle. The transmitter is capable of transmitting locational data regarding the vehicle. The loan status is monitored for a default condition. A data link is established from a base terminal to the transmitter of the vehicle upon an occurrence of the default condition in the loan status. Locational data is transmitted from the transmitter of the vehicle to the base terminal via the data link. The location of the vehicle is determined from the locational data transmitted to the base terminal. Finally, the vehicle is confiscated.

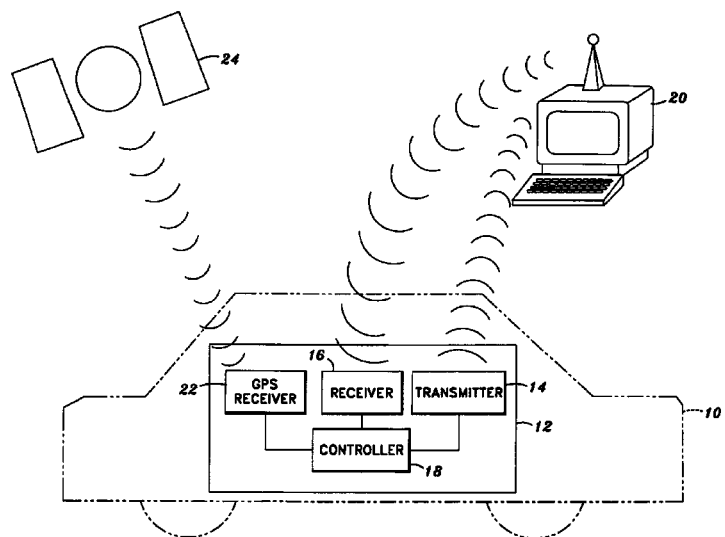

U.S. PATENT DOCUMENTS

| | | | |
|---|---|---|---|
| 5,334,974 | A | 8/1994 | Simms et al. |
| 5,365,451 | A | 11/1994 | Wang et al. |
| 5,389,934 | A | 2/1995 | Kass |
| 5,398,190 | A | 3/1995 | Wortham |
| 5,408,211 | A | 4/1995 | Hall |
| 5,414,432 | A | 5/1995 | Penny, Jr. et al. |
| 5,418,537 | A | 5/1995 | Bird |
| 5,490,200 | A | 2/1996 | Snyder et al. |
| 5,515,043 | A | 5/1996 | Berard et al. |
| 5,587,715 | A | 12/1996 | Lewis |
| 5,588,038 | A | 12/1996 | Snyder |
| 5,596,313 | A | 1/1997 | Berglund et al. |
| 5,719,551 | A | 2/1998 | Flick |
| 5,742,509 | A | 4/1998 | Goldberg et al. |
| 5,751,246 | A | 5/1998 | Hertel |
| 5,777,580 | A | 7/1998 | Janky et al. |
| 5,797,091 | A | 8/1998 | Clise et al. |
| 5,797,134 | A | 8/1998 | McMillan et al. |
| 5,808,564 | A | 9/1998 | Simms et al. |
| 5,825,283 | A | 10/1998 | Camhi |
| 5,883,594 | A | 3/1999 | Lau |
| 5,898,391 | A | 4/1999 | Jefferies et al. |
| 5,917,405 | A | 6/1999 | Joao |
| 5,918,180 | A | 6/1999 | Dimino |
| 5,939,975 | A | 8/1999 | Tsuria et al. |
| 5,999,125 | A | 12/1999 | Kurby |
| 6,069,570 | A | 5/2000 | Herring |
| 6,072,396 | A | 6/2000 | Gaukel |
| 6,084,870 | A | 7/2000 | Wooten et al. |
| 6,094,164 | A | 7/2000 | Murphy |
| 6,121,922 | A | 9/2000 | Mohan |
| 6,131,067 | A | 10/2000 | Girerd et al. |
| 6,240,365 | B1 | 5/2001 | Bunn |
| 6,278,936 | B1 | 8/2001 | Jones |
| 6,531,982 | B1 | 3/2003 | White et al. |
| 6,618,668 | B1 | 9/2003 | Laird |
| 6,657,857 | B2 | 12/2003 | Lan |
| 6,714,859 | B2 | 3/2004 | Jones |
| 6,741,927 | B2 | 5/2004 | Jones |
| 6,804,606 | B2 | 10/2004 | Jones |
| 6,812,829 | B1 | 11/2004 | Flick |
| 6,904,359 | B2 | 6/2005 | Jones |
| 6,952,645 | B1 | 10/2005 | Jones |
| 7,030,781 | B2 | 4/2006 | Jones |
| 7,031,826 | B2 | 4/2006 | Flick |
| 7,191,058 | B2 | 3/2007 | Laird et al. |

OTHER PUBLICATIONS

About Teletrac, printed Jan. 25, 2008, from http://www.teletrac.net/about, 2 pgs.

Teletrac—Vehicle Tracking Solutions, Stolen Vehicle Recovery and Mobile Information System, printed Jan. 25, 2008 from http://www/teletrac.net/teletracer, 3 pgs.

Motorola to unveil CreataLink pager and car–finder, printed Jan. 25, 2008 from http://chronicle.augusta.com/stories/121197/tech_carpager.s, 2 pgs.

Motorola's CreataLink 2 XT Two–W . . . , printed Jan. 25, 2008 from http://findarticles.com/p/particles/mi_moBFP/is_1999 Sep_13/al_55747, 6 pgs.

How OnStar Works, printed Jan. 9, 2008 from http://auto.howstuffworkds.com/onstar1.1, 4 pgs.

How OnStar Works, Statistics, printed Jan. 9, 2008 from http://auto.howstuffworks.com/onstar2, 5 pgs.

OnStar: 10 years after, printed Jan. 9, 2008 from http://findarticles.com/p/articles/mi_m0KJI/is_2_118/ai_n1608. 6 pgs.

The Global Positioning System: A Shared National Asset, GPS Applications and Requirements, printed Jan. 7, 2008 from hhttp://www.nap.edu/openbook,php?record_id=4920&page, 11 pgs.

Rappaport et al., "Position Location Using Wireless Communications on Highways of the Future", IEEE Communications Magazine, Oct. 1996, pp. 33–41.

"Passtec/Passtime Eliminate Delinquencies", printed Jan. 23, 2008 from http://www.dealermark.com/index/php?option=com_content&task=view&id=311&itemi, 4 pgs.

Green; "Car sellers turn to technology to secure payment, Bad–risk buyers get second chance", Oct. 2002, printed from http://www.promptpay.co.uk/se_union–news..., 3 pgs.

Knight Ridder News, "Devices can halt cars with tardy payments", Oct. 5, 2005, printed from http://www.billingsgazette.com/newdex–php/newdex.php?display=rednews/2005/10/04_build/business, 3 pgs.

Mysan.de Lifestyle News, If You Don't Pay On Time You Can't Start Your Car, printed Jan. 22, 2008 from http://www.sekurusontime.com/DNNImages/mysan, 2 pgs.

Munoz, "Late–pay penalty: You walk", Orange County Register, Nov. 21, 2002, printed from http://www.sekurusontime.com/DNNImages/register, 3 pgs.

Barlas, "For Avid Drivers, It's Light, Gears, Action", Investor's Business Daily, printed Jan. 22, 2008 from http://www.sekurusontime.com/DNNImages/investor, 1 pg.

Inc., The Magazine for Growing Companies, "Technology For Your Own Good Innovation", printed Jan. 22, 2008 from http://www.sekurusontime.com/DNNImages/inc., 1 pg.

Box, "No Credit? No problem", The Dallas Morning News, Dec. 19, 2005, printed from http://sekurusontime.com/DNNImages/union_2, 5 pgs.

Goforth et al., "Device remind car owner when payment due disables vehicle it it's missed", Akron Beacon Journal, printed Jan. 22, 2008 from http://www.sekurusontime.com/DNNImages/beackcon, 3 pgs.

St. Petersburg Times, "Late with a Payment? No wonder car won't start", Jul. 23, 2005, printed from http://www.sekurusontime.com/DDNImages/stpters, 2 pgs.

Mecoy, "Device Keeps Device on Credit Highway", The Oklahoman, Jun. 22, 2005, printed from http://www.sekurusontime.com;DNNImages/oklahoman, 2 pgs.

On Time Customer Testimonials, printed Jan. 22, 2008 from http://www.sekursontime.com/medla/testimonials/tabid/64/default, 2 pgs.

Zaccone, News, Views & Analysis Blogs by Allison Zaccone, printed Jan. 22, 2008 from http://www.ai–online.com/Adv/questionnaire/view.php?id=172&search, 3 pgs.

Kumler, "Dealers put halt to free rides", Oct. 25, 2004, reviewjournal.com, printed from http://www.reviewjournal.com/lvrj_home/20004/Oct–25–Mon/business/25043467.1, 4 pgs.

Kimberlin, "Can't make your car payment? They you can't get it started", The Virginian–Pilot, Nov. 28, 2005, printed from http://www.payteck.cc.news, 21 pgs.

Sekurus Inc., Executive Team, printed Jan. 22, 2008 from http://www.sekurus.com/executiveteam/tabid/137/default, 3 pgs.

Statewide Auto Broker Q&A, May 17, 2002, 1 pg.

Illinois Title Lenders Q&A, Aug. 8, 2002, 1 pg.

PacTel Teletrac, Transceiver Installation Guide, May 20, 1993, 31 pgs.

Motorola Introduces Wireless Automotive Solution for Controlling In–Vehicle Function, printed Feb. 20, 2008 from http://findarticles.com/p/articles/mi_m0EIN/is_1997_Dec_10/ai_2005, 9 pgs.

Eldredge, "Locked your keys in the car? Lost your car at the mall?", USA Today, Dec. 10, 1997, 1 pg.

Elite Logistics Inc. Completes PageTrack Distribution Agreement with Motorola Inc., printed Jan. 25, 2008 from http://findarticles.com/p/articles/mi_m0EIN/is_2001_Jan_16/ai_69025, 3pgs.

Juliano et al., "Wireless Data Communications Prototyping: A Flexible, High–Quality, and Cost Effective Information System for Education", 1995, 1995 ASCUE Proceedings, 12 pgs.

Juliano et al. "Managing School Buses on the Information Highway", Coastal Business Review, Dec. 1995, 9 pgs.

Juliano et al., "The Design, Analysis and Implementation of System Interfaces that Integrate the Magellen AIV–10 Global Positioning System Module and the Motorola ROM 4051 Radio Packet Model", Bulletin of the South Carolina Academy of Science, 1995, vol. LV, 3 pgs.

Wahab et al., "A Low–Cost Yet Accurate Approach to a Vehicle Location Tracking System", International Conference on Information, Communication and Signal Processing, Sep. 9, 1997, p. 461–465.

Tan et al., "GPS Decoder", IEEE, 1997, pp. 242–245.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 11 is cancelled.

Claims 1 and 15 are determined to be patentable as amended.

Claims 2-10 and 12-14, dependent on an amended claim, are determined to be patentable.

New claims 16-26 are added and determined to be patentable.

1. A method of securing collateral for a loan when indicated by a loan status, the collateral comprises a vehicle, a transmitter capable of transmitting locational data regarding the vehicle is installed within the vehicle, the method comprising the steps of:
   (a) receiving a signal in response to a change in the loan status;
   (b) establishing a data link from a base terminal to the transmitter upon the receipt of the signal representative of a change in the loan status;
   (c) transmitting locational data from the transmitter to the base terminal via the data link; and
   (d) determining the location of the vehicle from the locational data transmitted to the base terminal for use in confiscating the vehicle;
   *wherein a GPS positioning signal receiver is installed within the vehicle and the transmitted locational data is based upon a received GPS positioning signal.*

15. A method of securing collateral for a loan when indicated by a loan status, the collateral comprises a vehicle, a transmitter capable of transmitting locational data regarding the vehicle is installed within the vehicle, the method comprising the steps of:
    (a) receiving a signal in response to a change in the loan status;
    (b) establishing a data link from a base terminal to the transmitter upon the receipt of the signal representative of the loan status being in a default condition;
    (c) transmitting locational data from the transmitter to the base terminal via the data link; and
    (d) determining the location of the vehicle from the locational data transmitted to the base terminal for use in confiscating the vehicle;
    *wherein a GPS positioning signal receiver is installed within the vehicle and the transmitted locational data is based upon a received GPS positioning signal.*

*16. The method of claim 1, wherein the loan status is contained on a computer network.*

*17. The method of claim 16, wherein the base terminal is in electrical communication with the computer network.*

*18. The method of claim 1, further comprising establishing a data link from a global positioning satellite (GPS) to the GPS positioning signal receiver upon receipt of a transmit request signal.*

*19. The method of claim 4, wherein the transmitter capable of transmitting locational data regarding the vehicle, the base communication receiver, and the GPS positioning signal receiver are included within a retrieval apparatus that further comprises a controller electrically connected to the transmitter and the base communication receiver.*

*20. The method of claim 19, further comprising powering the retrieval apparatus with a rechargeable battery.*

*21. The method of claim 9, wherein the transmitter capable of transmitting locational data regarding the vehicle, the base communication receiver, and the GPS positioning signal receiver are included within a retrieval apparatus that further comprises a controller electrically connected to the transmitter and the base communication receiver.*

*22. The method of claim 21, wherein:*
   *the controller is in electrical communication with an audio device; and*
   *enabling the vehicle alarm comprises the base communication receiver communicating the vehicle alarm signal to the controller which electrically enables the audio device.*

*23. The method of claim 22, wherein the audio device is a vehicle horn.*

*24. The method of claim 22, wherein the audio device is a speaker.*

*25. The method of claim 21, wherein:*
   *the controller is in electrical communication with a visual device; and*
   *enabling the vehicle alarm comprises the base communication receiver communicating the vehicle alarm signal to the controller which electrically enables the visual device.*

*26. The method of claim 25, wherein the visual device is a light.*

\* \* \* \* \*